(12) United States Patent　(10) Patent No.: US 11,078,026 B2
Carlsson et al.　(45) Date of Patent: Aug. 3, 2021

(54) CONVEYOR BELT BLOWER

(71) Applicant: John Bean Technologies AB, Helsingborg (SE)

(72) Inventors: Bo Richard Jimmy Carlsson, Ängelholm (SE); Jonas Christopher Fogelqvist, Rydebäck (SE); Lars Johan Siljeborn, Dalby (SE)

(73) Assignee: John Bean Technologies AB, Helsingborg (SE)

( * ) Notice: Subject to any disclaimer, the term of this patent is extended or adjusted under 35 U.S.C. 154(b) by 0 days.

(21) Appl. No.: 16/667,721

(22) Filed: Oct. 29, 2019

(65) Prior Publication Data

US 2021/0122582 A1　Apr. 29, 2021

(51) Int. Cl.
*B65G 45/22*　　(2006.01)
*B65G 45/26*　　(2006.01)
*B65G 15/28*　　(2006.01)

(52) U.S. Cl.
CPC ............. *B65G 45/22* (2013.01); *B65G 15/28* (2013.01); *B65G 45/26* (2013.01); *B65G 2207/24* (2013.01)

(58) Field of Classification Search
CPC .......... B65G 45/22; B65G 45/26; F26B 19/00
USPC .................................... 198/495, 952; 34/236
See application file for complete search history.

(56) References Cited

U.S. PATENT DOCUMENTS

| | | | | |
|---|---|---|---|---|
| 4,951,648 A * | 8/1990 | Shukla | ................... | A21B 1/245 126/21 A |
| 5,289,759 A * | 3/1994 | Hufford | ................ | A47J 37/044 219/388 |
| RE35,259 E | 6/1996 | Williams | | |
| 5,651,191 A * | 7/1997 | Walunas | ................ | F26B 15/143 34/236 |
| 5,669,288 A * | 9/1997 | Zittel | ..................... | A23N 12/04 134/132 |
| 6,105,485 A * | 8/2000 | Zittel | ....................... | A23B 7/06 134/132 |
| 6,990,751 B2 * | 1/2006 | Riley | ................... | F26B 21/004 34/236 |

(Continued)

FOREIGN PATENT DOCUMENTS

FR　2 700 758 A1　7/1994
GB　1 379 370　　1/1975

(Continued)

OTHER PUBLICATIONS

US 2006/0130357 A1, Long, Jr., Jun. 22 (Year: 2006).*

(Continued)

*Primary Examiner* — Douglas A Hess
(74) *Attorney, Agent, or Firm* — Christensen O'Connor Johnson Kindness PLLC (57) ABSTRACT

A conveyor belt blower for a conveyor belt having an infeed portion and a return portion having a width includes a pressure distribution assembly located between the infeed portion and the return portion, a plenum body having first and second ends, wherein the plenum body extends across at least a portion of the width of the return portion, a nozzle assembly having at least one opening extending along a length of the plenum body that is configured to direct air onto the return portion, and an air movement device in communication with the first end of the plenum body for flowing air into the plenum body.

20 Claims, 9 Drawing Sheets

(56) References Cited

U.S. PATENT DOCUMENTS

| | | | | |
|---|---|---|---|---|
| 7,195,551 B2* | 3/2007 | Shefet | .................. | A22C 11/001 |
| | | | | 426/513 |
| 7,748,313 B2* | 7/2010 | Tyndall | ............... | A47J 27/0817 |
| | | | | 99/404 |
| 8,261,658 B1* | 9/2012 | Rouse | ..................... | A47J 27/04 |
| | | | | 99/443 C |
| 8,707,989 B2* | 4/2014 | Pucciani | ................... | F16L 3/16 |
| | | | | 137/561 A |
| 8,733,255 B2* | 5/2014 | Moreno Rueda | .......... | F23J 1/02 |
| | | | | 110/165 R |
| 9,700,059 B2* | 7/2017 | van der Eerden | ....... | A21B 3/04 |
| 10,113,795 B2* | 10/2018 | Hoffman, Jr. | ........... | F26B 15/12 |
| 10,401,086 B2* | 9/2019 | Pucciani | ................. | F26B 15/18 |
| 10,463,187 B2* | 11/2019 | van de Rijt | .............. | A21B 3/04 |
| 2003/0061725 A1 | 4/2003 | Riley et al. | | |

FOREIGN PATENT DOCUMENTS

| | | |
|---|---|---|
| WO | 2011/047686 A1 | 4/2011 |
| WO | 2019/175353 A1 | 9/2019 |

OTHER PUBLICATIONS

International Search Report and Written Opinion dated Feb. 1, 2021, in corresponding International Application No. PCT/EP2020/078591, filed Oct. 12, 2020, 18 pages.

Man Machine, "Manufacturing of Production Lines," <https://www.manmachine-eg.com> (retrieved Jan. 18, 2021), Mar. 12, 2011, 6 pages.

* cited by examiner

CONVEYOR BELT BLOWER

BACKGROUND

A freezer or chiller typically includes moisture within the interior of the freezer/chiller compartment, such as on the conveyor belt, after defrosting the compartment, after cleaning or rinsing the compartment, etc. Drying or otherwise removing moisture from the freezer (or chiller) after defrost, cleaning, rinsing, etc., and before bringing the compartment back down to the freezing or cooling temperature, is important especially for mechanical reasons. For example, if there is significant water left on the conveyor belt of a freezer after defrost or cleaning/rinsing, it can cause issues when the compartment is lowered in temperature and the water freezes. The frozen water on the belt can prevent belt movement, obstruct airflow, or cause other issues. Certain freezing or cooling applications may also require a substantially dry compartment in order not to adversely affect product hygiene or product quality.

A typical prior art method for drying a spiral freezer may involve using a blower such as a high-pressure air source or a fan arrangement to blow water off the belt. The blower may source air from outside the compartment to minimize heat produced inside the compartment, for instance, by the motor of the blower. However, the air outside the compartment is typically warmer and of a higher humidity than the drier, cooler air inside the compartment. Moreover, the outside air may not be sterile like the compartment air, so there is a risk of blowing debris onto the belt. Further, excessive noise results when the blower is arranged at least partially outside the compartment, which impacts operator safety and comfort. Finally, any equipment located outside the compartment increases the overall footprint of the freezer/chiller.

The blower may be arranged inside the compartment to help avoid the above-noted issues. In such an arrangement, the blower may be positioned above the infeed portion of the conveyor belt (i.e., on which workpieces are fed into the compartment for processing) to blow air down through the infeed portion and the return portion of the belt. The blower may also be arranged with a nozzle or other air directing device to help focus the blown air and minimize the horsepower needed from a motor or the like for moving the air, thereby minimizing heat production. If the blower is arranged above the infeed portion, however, it will need to be located a sufficient distance above the belt to provide clearance for the workpiece passing beneath. However, the further the blower is from the belt, the more power is needed to achieve the required drying/defrosting effects.

Accordingly, it can be appreciated that an improved conveyor belt blower/defroster is needed for a spiral freezer or the like.

SUMMARY

In an embodiment, a conveyor belt blower for a conveyor belt having an infeed portion and a return portion having a width includes a pressure distribution assembly located between the infeed portion and the return portion, a plenum body having first and second ends, wherein the plenum body extends across at least a portion of the width of the return portion, a nozzle assembly having at least one opening extending along a length of the plenum body that is configured to direct air onto the return portion, and an air movement device in communication with the first end of the plenum body for flowing air into the plenum body.

In one aspect, the at least one opening extends across the width of the return portion.

In another aspect, the conveyor belt blower further includes at least one of a first guide plate defined at a first end of the at least one opening that is configured to direct air flowing out of the at least one opening toward a first lateral edge of the return portion, and a second guide plate defined at a second end of the at least one opening that is configured to direct air flowing out of the at least one opening toward a second lateral edge of the return portion.

In another aspect, the conveyor belt blower is configured to blow at least one of liquid, ice, and frost off the return portion.

In another aspect, the conveyor belt blower further includes a collection bin located below the pressure distribution assembly that is configured to receive at least one of frost and ice blown off the return portion.

In another aspect, the conveyor belt blower further includes a defrost assembly associated with the collection bin. In one aspect, the defrost assembly is at least one of a heater and a frost removal device.

In another aspect, the elongated opening of the nozzle assembly is substantially the same length as the plenum body.

In another aspect, the plenum body tapers in cross-sectional size as it extends from the first end to the second end.

In another aspect, at least one of a cross-sectional size of the plenum body decreases as it extends from the first end to the second end, a height of the plenum body decreases as it extends from the first end to the second end, and a width of the plenum body decreases as it extends from the first end to the second end such that substantially even air flow out of the nozzle assembly results along the length of the plenum body.

A processing machine includes a housing that substantially encloses a work area for processing at least one workpiece, a conveyor belt having an infeed portion for moving the at least one workpiece through the housing for processing, and a return portion having a width, and a conveyor belt blower located inside the housing. The conveyor belt blower may include a pressure distribution assembly located between the infeed portion and the return portion that directs air onto the return portion and an air movement device in communication with the pressure distribution assembly for flowing air into the pressure distribution assembly, wherein the air movement device located on a side of the conveyor belt.

In one aspect, the pressure distribution assembly includes a plenum body having first and second ends, with the plenum body extending across at least a portion of the width of the return portion, and a nozzle assembly having at least one opening extending along a length of the plenum body that is configured to direct air onto the return portion.

In another aspect, the air movement device is in communication with the first end of the plenum body and is configured to flow air into the plenum body.

In another aspect, the at least one opening extends across the width of the return portion.

In another aspect, the processing machine further includes at least one of a first guide plate defined at a first end of the at least one opening that directs air flowing out of the at least one opening toward a first lateral edge of the return portion, and a second guide plate defined at a second end of the at least one opening that directs air flowing out of the at least one opening toward a second lateral edge of the return portion.

In another aspect, the processing machine further includes a collection bin located below the pressure distribution assembly.

In another aspect, the processing machine further includes a defrost assembly associated with the collection bin.

In another aspect, the plenum body tapers in cross-sectional size as it extends from the first end to the second end.

In another aspect, at least one of a cross-sectional size of the plenum body decreases as it extends from the first end to the second end, a height of the plenum body decreases as it extends from the first end to the second end, and a width of the plenum body decreases as it extends from the first end to the second end such that substantially even air flow out of the at least one opening results along the length of the plenum body.

In another aspect, the conveyor belt defines a self-stacking spiral conveyor system within the housing.

A method of drying a conveyor belt inside a processing machine includes positioning a plenum body between an infeed portion and a return portion of the conveyor belt, where the plenum body has a length extending between first and second ends, flowing air into the plenum body, and directing high-pressure air out of the plenum body onto the return portion of the conveyor belt.

In one aspect, the method includes positioning the plenum body such that an elongated opening of the plenum body is substantially transverse to a longitudinal axis of the return portion and the elongated opening extends across a width of the return portion.

In another aspect, the method includes creating a substantially even pressure drop along the length of plenum body when the high-pressure air flows out of the plenum body.

In another aspect, the method includes flowing air into the plenum body with an air movement device positioned inside the processing machine.

A method of defrosting a conveyor belt inside a cooling compartment having an air cooler unit includes positioning a plenum body between an infeed portion and a return portion of the conveyor belt, where the plenum body has a length extending between first and second ends, operating the air cooler unit to supply refrigerated treatment gas to workpieces on the conveyor belt, flowing air into the plenum body, and directing high-pressure air out of the plenum body onto the return portion of the conveyor belt.

In one aspect, the method includes positioning the plenum body such that an elongated opening of the plenum body is substantially transverse to a longitudinal axis of the return portion and the elongated opening extends across a width of the return portion.

In another aspect, the method includes creating a substantially even pressure drop along the length of plenum body when the high-pressure air flows out of the plenum body.

In another aspect, the method includes flowing air into the plenum body with an air movement device positioned inside the processing machine.

In one aspect, the method includes collecting at least one of ice and frost below the return portion.

In one aspect, the conveyor belt defines a self-stacking spiral conveyor system within the cooling compartment.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "upper," "lower," "front," "back," "ahead," "behind," "upward," "downward," "above," "below," "top," "bottom," "in," "out," "extended," "advanced," "retracted," "proximal," "distal," etc. These references and other similar references in the present application are only to assist in helping describe and understand the present disclosure and are not intended to limit the present invention to these directions.

The present application may also include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally rectangular in shape," the shape need not be exactly rectangular as long as the required function of the structure in question can be carried out.

Further, the systems and methods described herein, though specifically applicable to workpieces or food items, may also be used outside of the food area. The workpiece may be a food product, such as meat, poultry, or fish, or another type of product, such as, for example, fabric, rubber, cardboard, plastic, wood or other types of material. Accordingly, "workpieces" may include non-food items.

Embodiments of the present disclosure are directed to a conveyor belt blower for use in a cooling compartment of a freezer system, such as a self-stacking spiral freezer system. It should be appreciated, however, that a freezer system in accordance with embodiments of the present disclosure need not include a spiral stack, as described herein. In that regard, the systems described herein may be used with other respective belt assemblies, such as a linear belt conveyor system. Exemplary embodiments of the conveyor belt blower will also hereinafter be described with respect to spiral conveyor freezer system having a mesh conveyor belt; however, it should be appreciated that embodiments of the conveyor belt blower described herein may instead be adapted for any suitable processing machine having any suitable conveyor belt system.

In addition, the systems and methods described herein can be used with other suitable cooling compartments, such as a cooling compartment of a refrigerator, a chiller, etc. Accordingly, the term "cooling compartment" shall be broadly interpreted to mean any compartment of a system that is cooled (for instance, to treat a food product) and that may accumulate moisture on the belt inside the chamber over time, such as with a freezer compartment, a refrigeration compartment, a chiller compartment, or any other suitable compartment. In that regard, specific configurations and process steps may be suitable for different cooling chambers and configurations. It should also be appreciated that the terms "moisture," "water," "ice," "frost,", or the like may include any suitable moisture or frozen fluid accumulated within the cooling compartment.

Exemplary embodiments of a self-stacking spiral freezer system and conveyor belt system will first be described.

Figure 1:
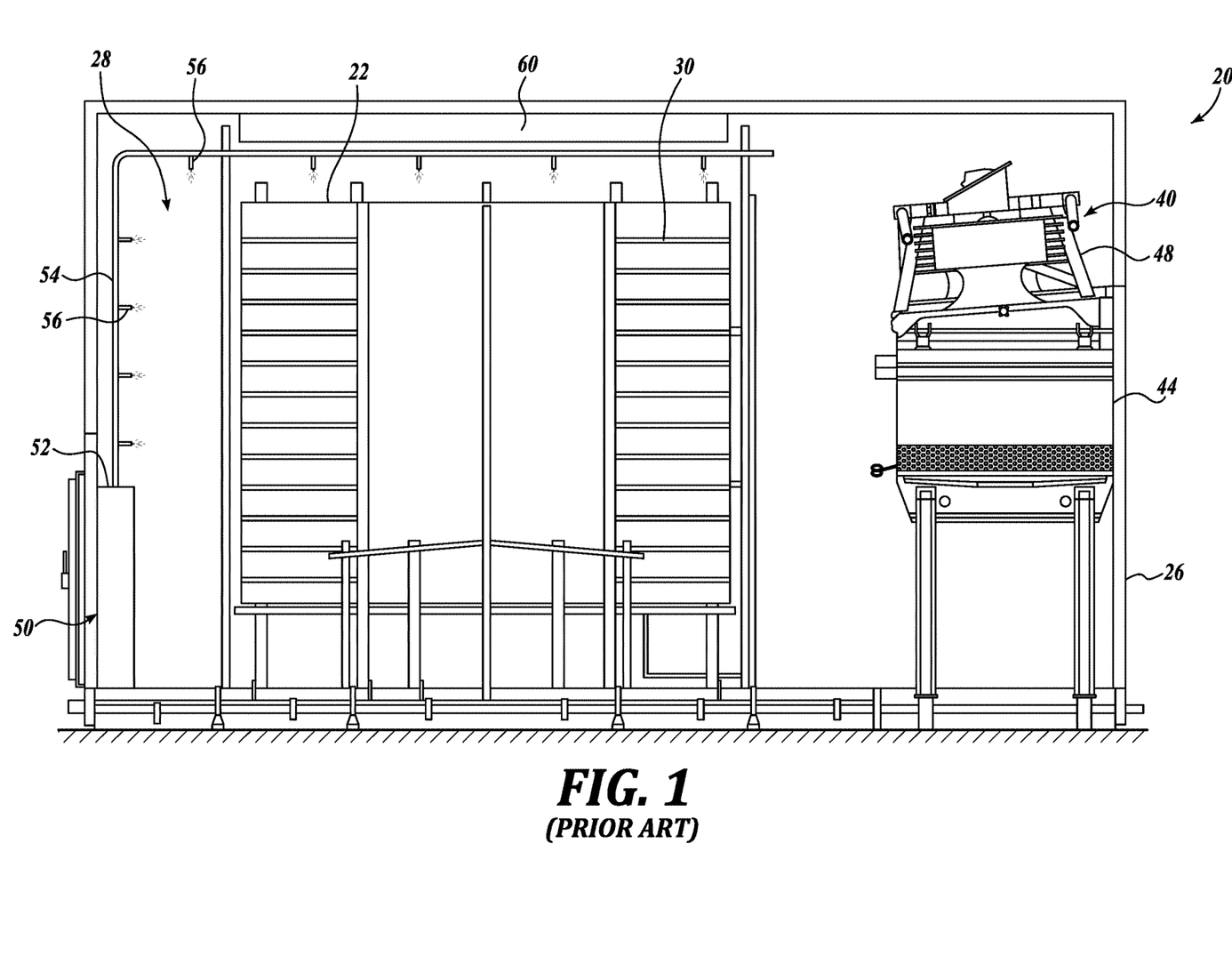
FIG. 1 is a cross-sectional view of an exemplary prior art freezer system including a spiral stack in a freezer chamber.

Referring to FIG. 1, an exemplary prior art spiral freezer system 20 is depicted. The spiral freezer system 20 includes a spiral stack 22 contained within an insulated housing 26 defining a cooling compartment 28. The spiral stack 22 is formed from a pervious conveyor belt 30 that supports and transports products within the freezer chamber 26. The conveyor belt 30 moves in both linear and spiral patterns within the spiral freezer system 20. More specifically, the conveyor belt 30 moves in a linear pattern at the entry and exit portals (not shown) of the spiral stack 22, and the conveyor belt 30 moves in a spiral or helical path within the spiral stack 22. The conveyor belt 30 moves products within the spiral stack 22 in an ascending or descending spiral or helical path as is well known in the art.

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

The spiral freezer system 20 includes an air cooler unit 40 for supplying refrigerated treatment gas to food products within the spiral stack 22. In that regard, the air cooler unit 40 includes a coil assembly, an evaporator 44, at least one fan 48, and other necessary components, such as a compressor, condenser, etc. (not shown in FIG. 1), for supplying suitable treatment gas for heat exchange with the products, as is well known in the art.

The spiral freezer system 20 may further include an integrated cleaning system 50 configured to wash, rinse, or sanitize the interior of the freezer. Any suitable integrated or separate cleaning system may be used to clean the interior of the freezer. In the depicted embodiment, the cleaning system 50 includes a cleaning agent supply source 52 that supplies a cleaning agent (such as pressurized water, water+cleaning chemicals, steam, etc.) to one or more outlets 56 (such as sprinkler heads, nozzles, etc.) through a cleaning agent supply line 54. A belt blower 60 may be used to blow excess cleaning agent off the stack 22 at the end of the cleaning process. However, it can be appreciated that after cleaning and/or rinsing the interior of the freezer, or after other similar processes, residual moisture will remain on the belt 30 inside the freezer compartment 28.

Figure 2:
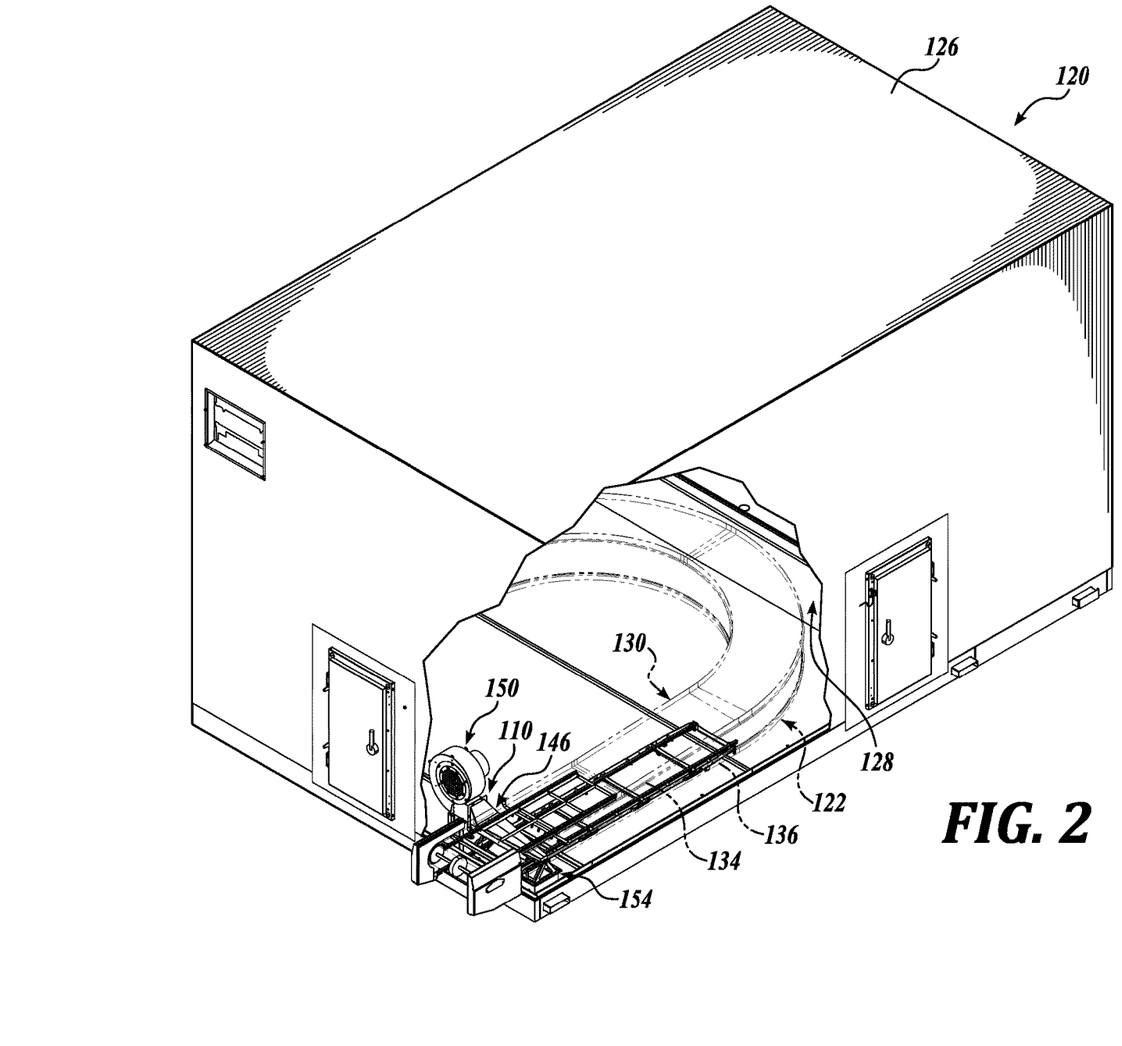
FIG. 2 is an isometric environmental view of a processing machine having a conveyor belt blower formed in accordance with an exemplary embodiment of the present disclosure.

FIG. 2 depicts a conveyor belt blower 110 for use with a spiral freezer system 120 or another suitable processing machine. The spiral freezer system 120 is similar to the prior art spiral freezer system 20 described above with respect to FIG. 1. In that regard, similar parts are labeled with the same part number except in the '100 series for ease of reference. Moreover, detailed aspects of the spiral freezer system 120, such as the spiral stack, the air cooler unit, and the cleaning system are not shown for clarity.

The spiral freezer system 120 is shown having an insulated housing 126 defining a cooling compartment 128. The continuous conveyor 122 is defined as a spiral stack (not shown in full) formed from a pervious conveyor belt 130 that supports and transports workpieces within the freezer chamber 126. The conveyor belt 130 may move in both linear and spiral patterns within the spiral freezer system 120, as described above. Moreover, the conveyor belt 130 includes an infeed portion 134 for conveying workpieces into and within the chamber 126 for processing (e.g., freezing) from an inlet end and a return portion 136 traveling beneath the infeed portion for returning the conveyor belt 130 to the inlet end. The conveyor belt 130 may be driven by a suitable belt drive assembly, which may be part of the spiral stack.

Figures 3A, 3B:
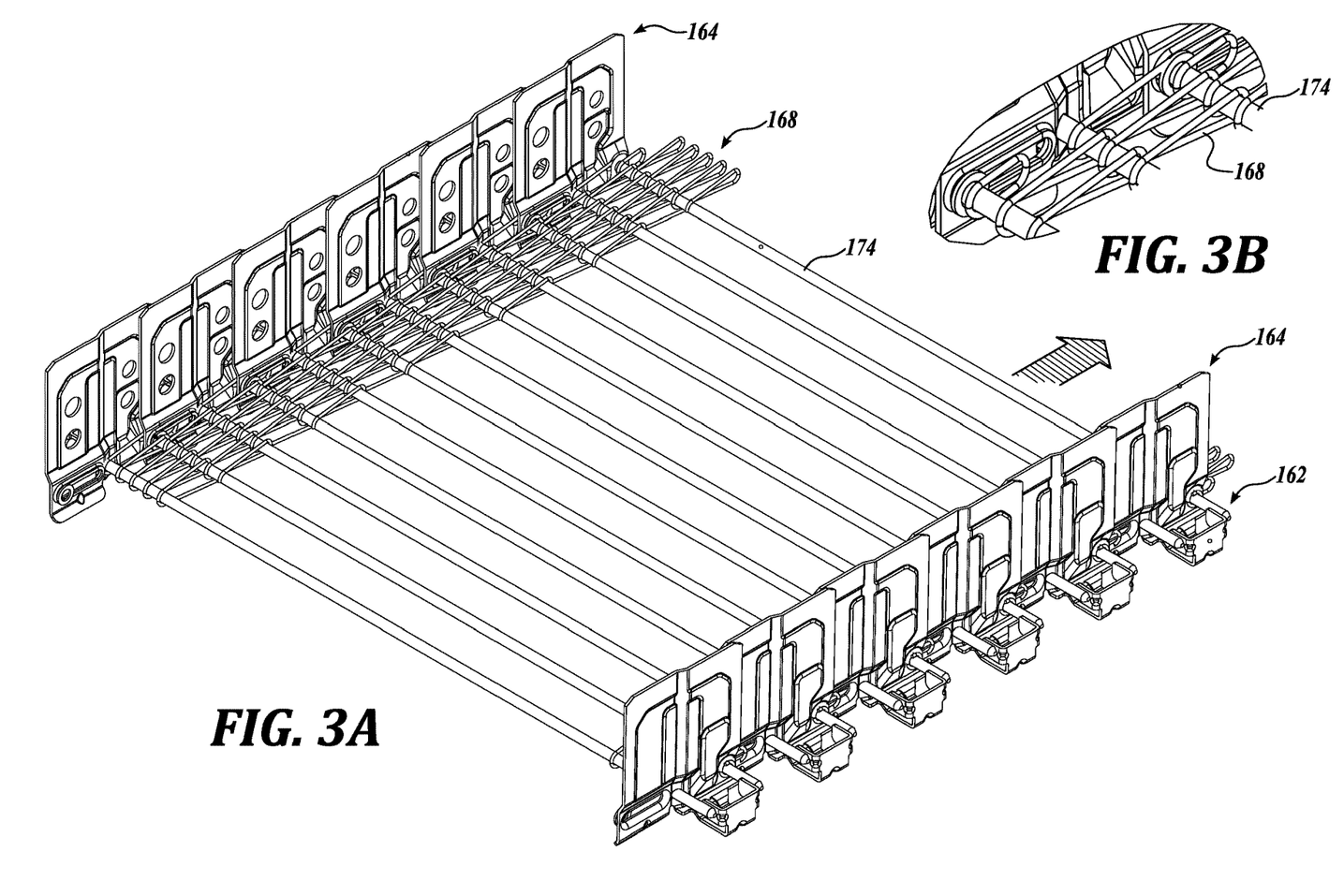
FIG. 3A is an isometric view of an exemplary conveyor belt configured for use with the conveyor belt blower disclosed herein.
FIG. 3B is an isometric zoomed-in view of a portion of the conveyor belt shown in FIG. 3A.

In one embodiment, and referring to FIGS. 3A and 3B, the conveyor belt 130 may be of a metallic construction configured in grid or open form. In the depicted embodiment, the belt 130 is composed of wire links 168 extending between spaced metal cross pins 174 that are arranged substantially transversely to the longitudinal axis of the belt 130. In FIG. 3A, the links 168 are shown on only a portion of the width of the belt 130 but it should be appreciated that in use the links 168 will extend across the entire width of the belt 130. Belt drive engaging features 162 may extend along each side margin of the belt 130 for engaging the belt drive assembly (not shown). Belt 130 can be formed without the belt drive engaging features 162, in which case the belt drive assembly can be designed to engage the outermost portions of belt 130. A collapsible side wall or edge 164 may extend upwardly and downwardly from the belt 130 between the links 168/pins 174 and the belt drive engaging features 162. Of course, belt 130 can be of numerous other types of construction, with FIGS. 3A and 3B merely being illustrative of possible constructions.

Figure 4:
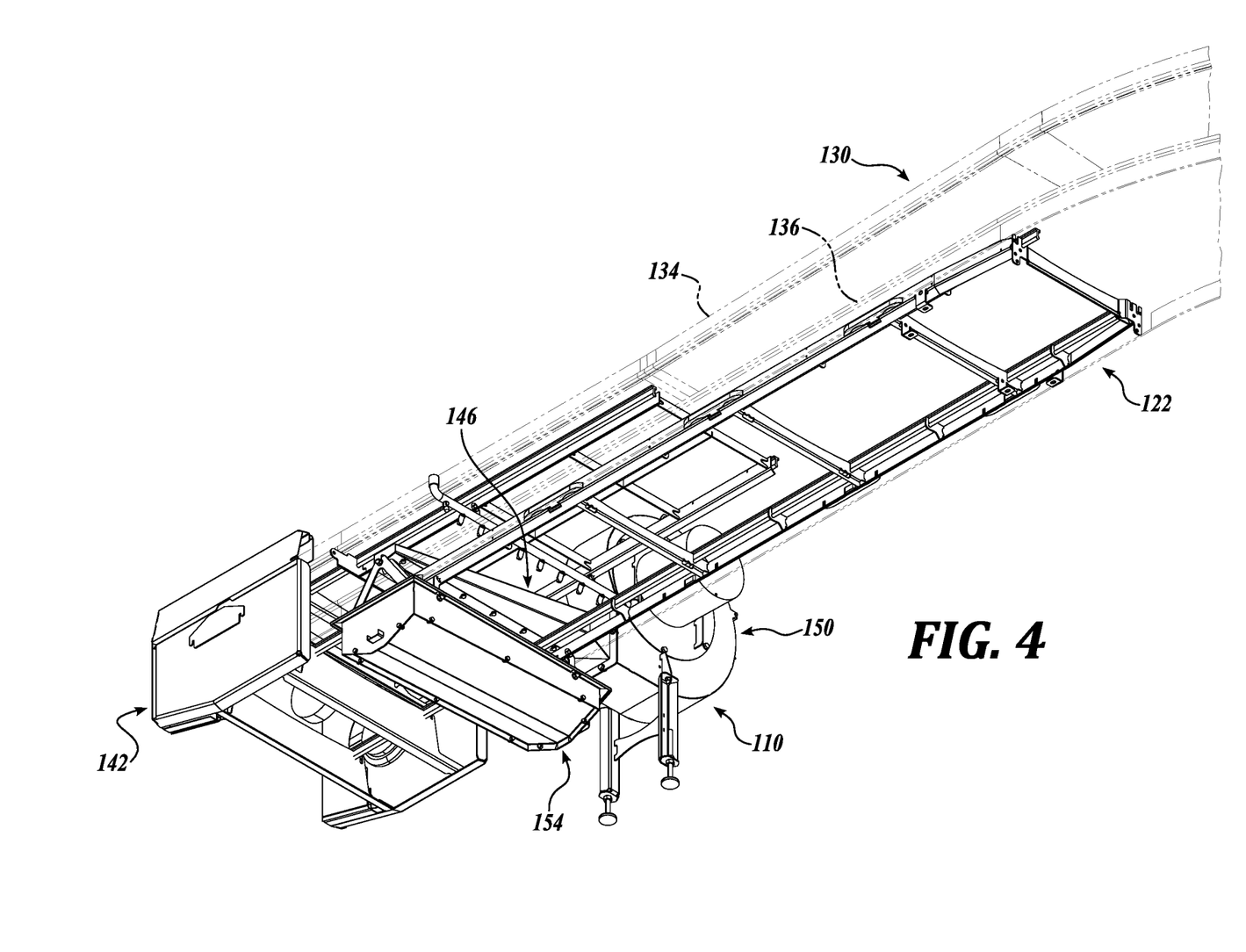
FIG. 4 is an isometric bottom view of the conveyor belt blower of FIG. 2 shown in use with a portion of a conveyor belt.

Referring to FIGS. 2 and 4, the conveyor belt blower 110 suitable for drying and/or defrosting the conveyor belt 130 will now be described in detail. In general, the conveyor belt blower 110 is configured to blow high-pressure air onto the return portion 136 of the conveyor 122 to blow any moisture, ice, frost, etc., off the belt as it passes beneath the blower 110. In that regard, the conveyor belt blower 110 is configured to blow air downwardly directly onto the return portion 136 of the conveyor 122 such that the blower does not interfere with workpieces being conveyed on the infeed portion 134 and such that drying and defrosting capacity is maximized. Further, by blowing air directly onto the return portion 136 of the conveyor 122, rather than onto the infeed portion 134, the moisture, ice, frost, etc., is blown onto the housing floor (or collection area) rather than onto the return portion. Further, the blower will not disturb or damage the workpieces as they are being conveyed on the infeed portion 134 since the air is only blown onto the return portion 136. It can be appreciated that high-pressure air blown onto the infeed portion 134 may cause the workpieces to move on the belt 130, causing issues with scanning and/or processing. With the conveyor belt blower 110 blowing air only onto the return portion 136, it can be used even when workpiece is being processed on the infeed portion 134.

The conveyor belt blower 110 is also configured to be located inside the insulated housing 126 such that it may blow recirculated cool, dry, clean air of the freezer system onto the conveyor belt 130, rather than the warmer, moister, unsterile air outside the housing 126 of the spiral freezer system 120. In that regard, the overall footprint and noise production of the spiral freezer system 120 in the processing facility is also minimized (i.e., little to no equipment outside the housing 126).

In accordance with at least the foregoing parameters in mind, the conveyor belt blower 110 includes a pressure distribution assembly 146 located between the infeed portion 134 and the return portion 136 that is configured to direct high-pressure air downwardly onto the return portion 136, an air movement device 150 in communication with the pressure distribution assembly 146 for flowing air into the pressure distribution assembly 146, and an optional collection bin assembly 154 located below the pressure distribution assembly 146 for collecting any frost, ice, etc., blown off the return portion 136 of the conveyor 122.

Figure 5:
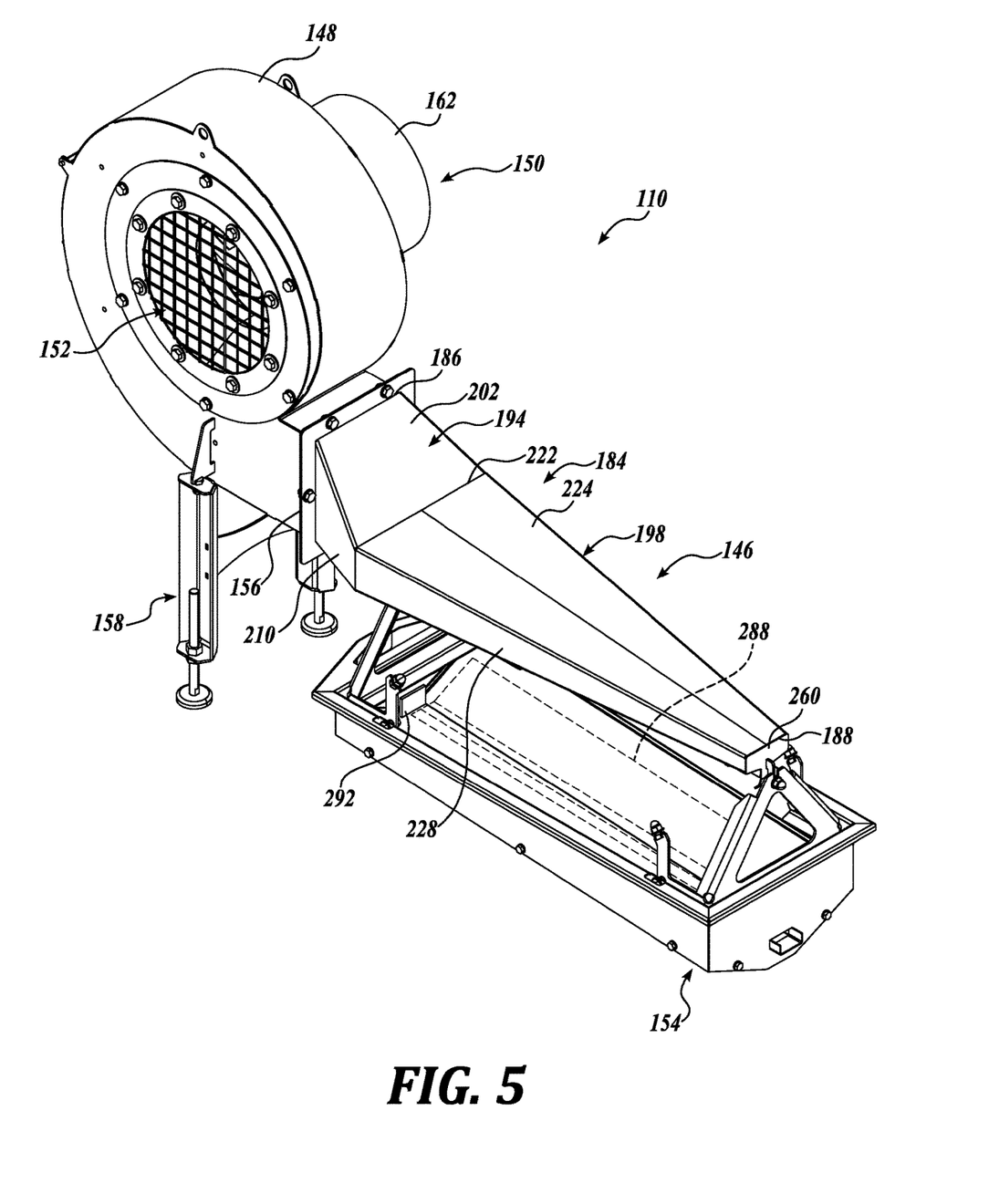
FIG. 5 is a top isometric view of the conveyor belt blower of FIG. 2 having an air movement device, a pressure distribution assembly, and a collection bin.
Figure 6:
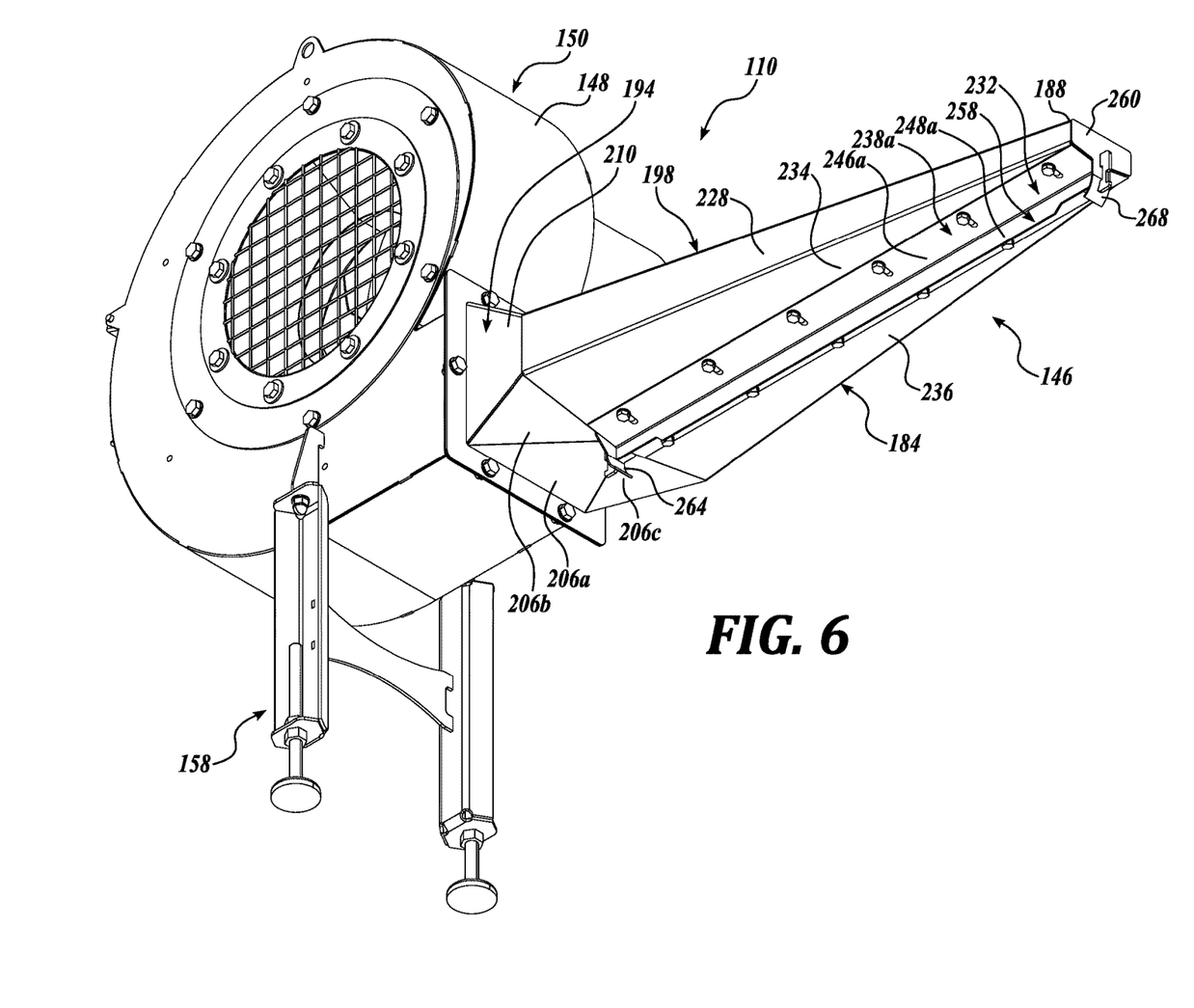
FIG. 6 is a bottom isometric view of the conveyor belt blower of FIG. 5 shown without the collection bin.

As may best be seen by referring to FIGS. 5 and 6, the air movement device 150 may be any suitable device configured to withdraw air from within the inside of the insulated housing 126 and push the withdrawn air into the pressure distribution assembly 146. For instance, the air movement device 150 may be a suitable fan, compressor, etc. In the depicted embodiment, the air movement device 150 is a centrifugal fan configured to move a substantially constant volume of air in a direction at an angle (e.g., about ninety degrees) to the incoming (withdrawn) air. In that regard, the air movement device 150 includes a fan housing 148 that defines an inlet duct 152 and an outlet duct 156, a fan wheel or impeller (not shown) rotatably secured within the housing 148 on a drive shaft, and a suitable motor 162 for turning the drive shaft (not labeled or shown in detail). The fan wheel includes a hub from which a plurality of fan blades extend, which may be arranged as forward-curved, backward-curved, or radial (also not labeled or shown in detail). For instance, in one embodiment, a centrifugal fan having backward curved fan blades has found to be efficient.

The air movement device 150 is located alongside the conveyor 122 to position the outlet duct 156 at a height between the infeed portion 134 and the return portion 136. A suitable fan mounting assembly 158 may be used to secure the air movement device 150 in its position relative to the conveyor 122. With the air movement device 150 positioned alongside the conveyor 122, rather than above the conveyor, there is less risk of contaminating workpieces being conveyed on the infeed portion 134 (e.g., no debris or dirt from the air movement device falling down onto the infeed portion).

The outlet duct 156 of the air movement device 150 is in fluid communication with the pressure distribution assembly 146, which, as noted above, is located between the infeed portion 134 and the return portion 136 of the conveyor 122. As can best be seen by referring to FIGS. 5-9, the pressure distribution assembly 146 includes a plenum body 184 having a first open end 186 in communication with the outlet duct 156 of the air movement device 150 and a second closed end 188 opposite the first end. The first open end 186 of the plenum body 184 includes a flanged perimeter (not labeled) that can be mated with a corresponding flanged perimeter (also not labeled) of the outlet duct 156 through fasteners or otherwise.

The plenum body 184 is shaped, sized, and configured to receive pressurized air from the air movement device 150 and substantially equalize the pressure of the air along the length of the plenum body 184 for being directed substantially evenly onto the return portion 136 of the conveyor 122. At the same time, at least a portion of the plenum body 184 is sized to fit between the infeed portion 134 and the return portion 136 for directing pressurized air onto the return portion 136.

In the depicted exemplary embodiment, the plenum body 184 includes an upstream plenum portion 194 extending from its first open end 186 and a downstream plenum portion 198 extending from the upstream plenum portion 194 to the second closed end 188. The upstream plenum portion 194 is generally shaped and sized to receive the incoming air from the air movement device 150 and direct the air into the downstream plenum portion 198, and the downstream plenum portion 198 is generally shaped and sized to extend between the infeed portion 134 and the return portion 136 and direct pressurized air onto a desired width of the return portion 136.

An exemplary embodiment of the upstream plenum portion 194 will first be described. In the depicted embodiment, the upstream plenum portion 194 is generally shaped and sized to direct the pressurized air from the outlet duct 156 of the air movement device 150 into the downstream plenum portion 198, where the opening of the outlet duct 156 has a height greater than the height of the opening at the upstream end of the downstream plenum portion 198 (i.e., the base 222, later described). Such a configuration may be used, for instance, where the downstream plenum portion 198 is of a reduced overall height relative to the outlet duct 156 such that it may fit between the infeed portion 134 and the return portion 136. In that regard, the upstream plenum portion 194 is configured to adapt the height of the outlet duct 156 to the lower downstream plenum portion 198. In other words, the outlet duct 156 has a height greater than the downstream plenum portion 198, so the air must be directed downwardly into the downstream plenum portion 198 through the upstream portion 194 (see FIG. 8).

At the same time, the upstream plenum portion 194 is configured to direct air from the outlet duct 156 into the downstream plenum portion 198 without undesirably restricting the flow of air into the downstream plenum portion 198. In that regard, the upstream plenum portion 194 generally increases in cross-sectional size as it extends toward the downstream plenum portion 198 to substantially prevent an undesirable pressure drop between the air movement device 150 and the downstream plenum portion 198, which could lead to uneven distribution of air exiting the downstream plenum portion 198.

Finally, the upstream plenum portion 194 is configured to facilitate easy and thorough cleaning of the air movement device 150 and/or the plenum body 184. For instance, the lower surfaces of the upstream plenum portion 194 are generally sloped to direct all fluid, such as water, cleaning solution, etc., downwardly into the downstream plenum portion 198. Further, it should be appreciated that the air movement device 150 and/or the plenum body 184 may include suitable access openings (such as a hatch opening, not shown) for introducing cleaning solution, water, pressurized air, etc., into the conveyor belt blower 110 and allowing any fluid to drain out of one or more openings in the downstream plenum portion 198.

In that regard, the upstream plenum portion 194 includes an upper surface 202 that is angled downwardly as it extends from the upstream end 186 of the plenum body 184 to the downstream plenum portion 198 to accommodate the decreased height of the downstream plenum portion 198. At the same time, the upper surface 202 widens as it extends from the upstream end 186 of the plenum body 184 to the downstream plenum portion 198 to help increase the overall cross-sectional size of the upstream plenum portion 194 as it extends toward the plenum portion 194.

The bottom of the upstream plenum portion 194 may be defined by one or more surfaces that angle at least slightly downwardly and outwardly as they extend from the upstream end 186 of the plenum body 184 to the downstream plenum portion 198. In the depicted embodiment, the bottom is defined by a middle lower surface 206a, a first lateral lower surface 206b, and a second lateral lower surface 206c (sometimes collectively referred to as the "lower surfaces 206"). The lower surfaces 206 cooperatively define an overall shape that substantially matches the shape of the upper surface 202 to further help increase the overall cross-sectional size of the upstream plenum portion 194 as it extends toward the plenum portion 194. The lower surfaces 206 each also extend downwardly from the upstream end 186 of the plenum body 184 to the downstream plenum portion 198, and the first and second lateral lower surfaces 206b and 206c extend downwardly from their outer edges to the middle lower surface 206a. In this manner, any fluid introduced into the conveyor belt blower 110 (such as for cleaning) will flow from the sides and upstream ends of the lower surfaces 206 toward the downstream plenum portion 198.

The first and second side surfaces 210 and 214 of the upstream plenum portion 194 extend from the upstream end 186 of the plenum body 184 to the downstream plenum portion 198 to substantially match the profile defined by the upper and lower surfaces 202 and 206.

It should be appreciated that the above-described shape of the upstream plenum portion 194 is exemplary only, and it may instead be defined by any other suitable shape and configuration. For instance, the shape and configuration may depend on the vertical location of the air movement device 150 relative to the conveyor 122, the capacity of the air movement device 150 and/or its outlet size, the cross-sectional shape and/or length of the plenum body 184, or other factors. Accordingly, the descriptions and illustrations provided herein should not be seen as limiting the scope of the claimed subject matter.

Referring still to FIGS. 5-9, the downstream plenum portion 198, which at least partially extends between the infeed and return portions 134 and 136 of the conveyor 122 and is configured to direct the pressurized air onto the return portion 136, will now be described. The downstream plenum portion 198 defines an interior plenum chamber 200 configured to substantially equalize the pressure of air flowing out of a plenum opening 220 defined along a length of the downstream plenum portion 198 (see FIG. 7). At the same time, the downstream plenum portion 198 is shaped to suitably fit between the infeed portion 134 and the return portion 136 of the conveyor 122. In this manner, hygiene is further improved since there is no risk of debris or dirt falling from the pressure distribution assembly 146 onto the infeed portion 134.

In the depicted embodiment, the downstream plenum portion 198 is of a generally elongated truncated pyramidal shape having an end plate or bracket 260 enclosing the truncated downstream apex end. More specifically, the downstream plenum portion 198 includes an open polygonal upstream base 222 defined by the intersection of the upstream plenum portion 194 and the downstream plenum portion 198. A downstream plenum portion upper surface 224 extends from a downstream edge of the upstream plenum portion upper surface 202 and tapers in width as it extends toward the downstream end 188 of the plenum body 184 to define an isosceles triangle shape with a truncated apex.

A downstream plenum portion first side surface 228 extends from the downstream edge of the upstream plenum portion first side surface 210 and tapers in height as it extends toward the downstream end 188 of the plenum body 184 to define an overall right triangle shape with a truncated apex. In other words, the upper edge of the first side surface 228 angles downwardly as it extends toward the downstream end 188 of the plenum body 184, whereas the bottom edge of the first side surface 228 remains substantially horizontal (see FIG. 8). A downstream plenum portion second side surface 228 extends from the downstream edge of the upstream plenum portion second side surface 214 and is substantially identical in shape and size to the downstream plenum portion first side surface 228.

Figure 8:
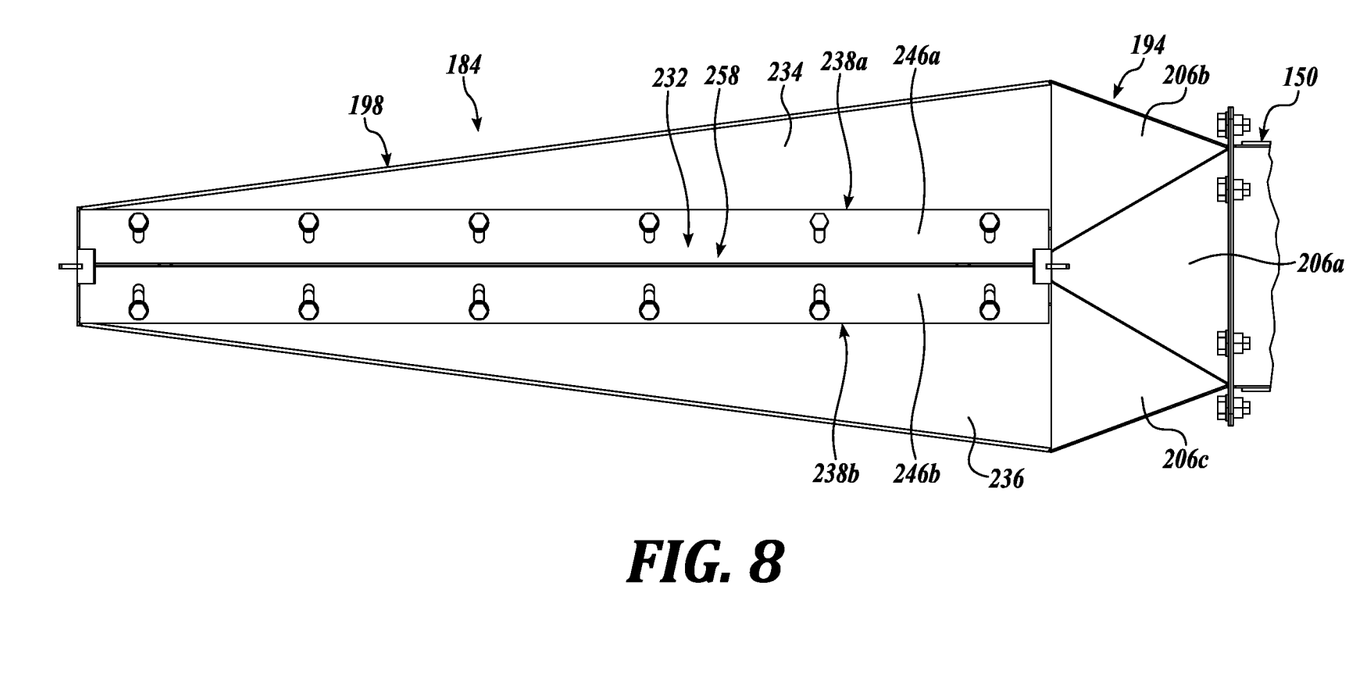
FIG. 8 is a bottom view of the plenum body of the pressure distribution assembly of the conveyor belt blower of FIG. 5.
Figure 9:
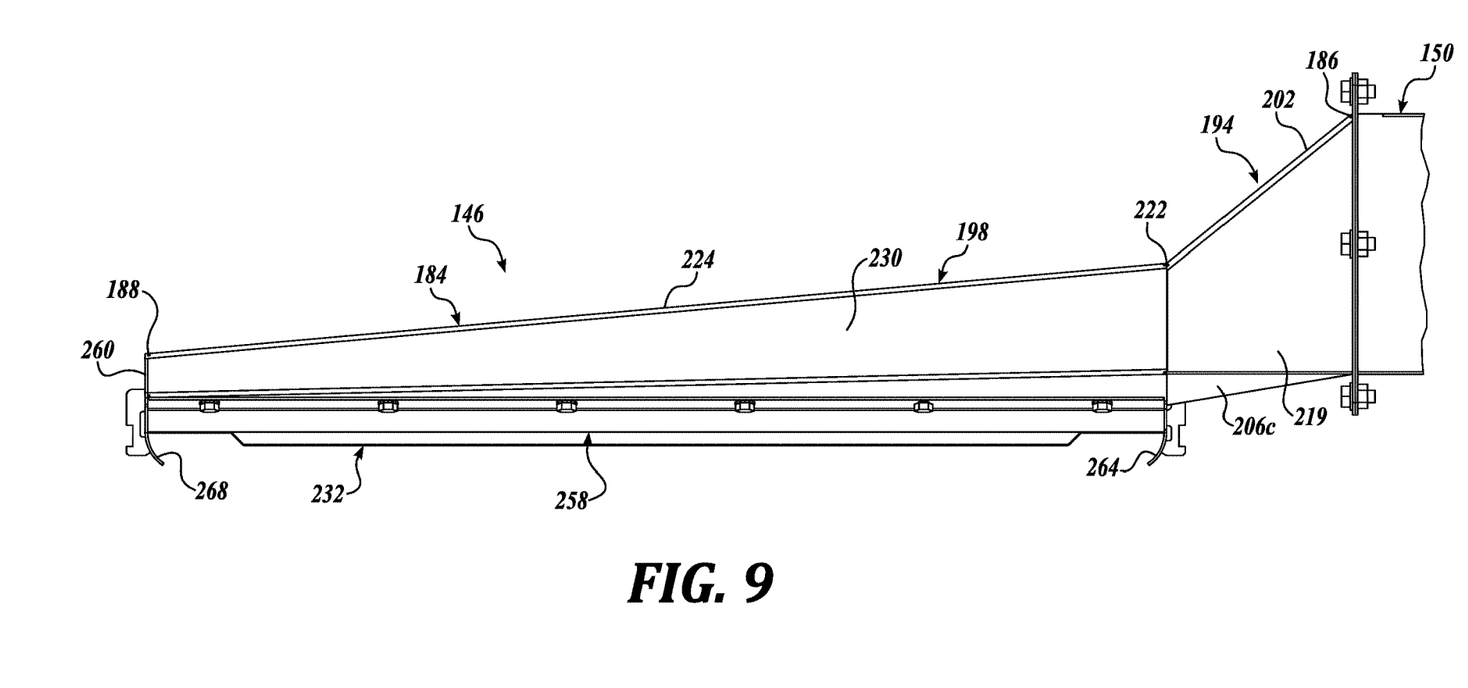
FIG. 9 is a side view of the plenum body of the pressure distribution assembly of the conveyor belt blower of FIG. 5.

A downstream plenum portion first lower surface 234 extends from the downstream edge of the upstream plenum portion first lateral lower surface 206b and tapers in width as it extends toward the downstream end 188 of the plenum body 184 to define an overall right triangle shape. When viewed from the bottom, as shown in FIG. 8, the outer lateral edge of the downstream plenum portion first lower surface 234 angles downwardly as it extends toward the downstream end 188 of the plenum body 184, whereas the inner edge defines a side of the elongated plenum opening 220. A downstream plenum portion second lower surface 236 mirrors the downstream plenum portion first lower surface 234 to define an overall truncated triangle-shaped bottom surface and an elongated substantially rectangular plenum opening 220.

The downstream plenum portion first and second lower surfaces 234 and 236 also extend downwardly from their outer later edges toward the plenum opening 220. At the same time, the downstream plenum portion first and second lower surfaces 234 and 236 extend downwardly from their upstream edges toward the downstream end 188 of the plenum body 184. In this manner, any fluid introduced into the conveyor belt blower 110 (such as for cleaning) will flow from the sides and upstream ends of the lower surfaces 234 and 236 out of the plenum opening 220.

Figure 7:
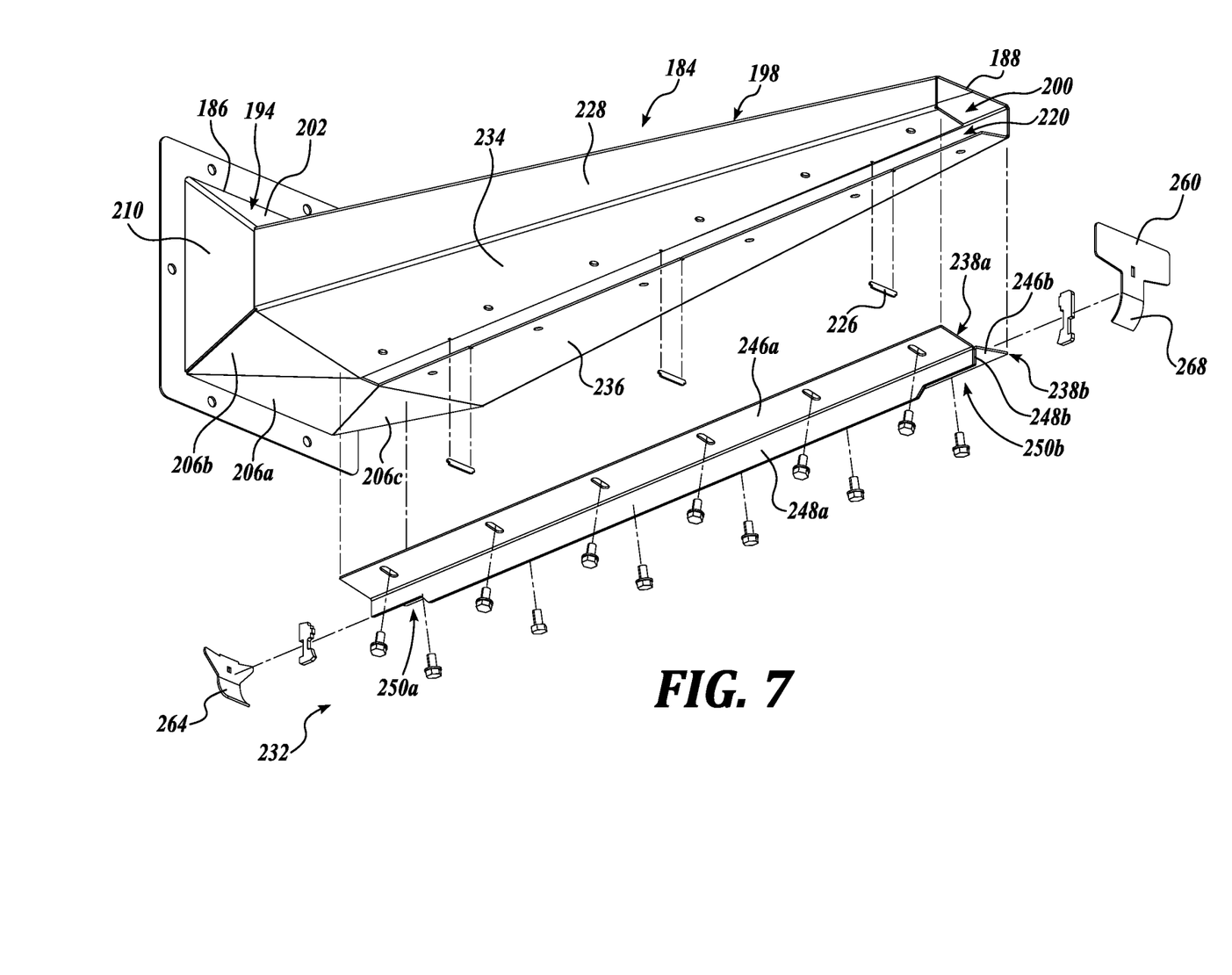
FIG. 7 is an exploded isometric view of a plenum body of the pressure distribution assembly of the conveyor belt blower of FIG. 5.

In the depicted embodiment, the plenum opening 220 extends along the bottom of the downstream plenum portion 198 and substantially transverse to a longitudinal axis of the return portion 136 of the belt 130 such that it is configured to direct air onto and across the width of the return portion 136. As can be seen in FIG. 7, the plenum opening 220 extends between substantially parallel inner edges of the first and second bottom surfaces 234 and 236. In that regard, in the depicted exemplary embodiment, the plenum opening 220 is a substantially elongated rectangular shape and also extends along the entire length of the downstream plenum portion 198 of the plenum body 184. The plenum opening 220 has a predetermined width defined by the space or gap between the inner edges of the first and second bottom surfaces 234 and 236. A series of stabilizing brackets 226 may extend across the width of the plenum opening 220 at spaced intervals to stabilize the downstream plenum portion 198 around the opening as high-pressure air passes therethrough.

It should be appreciated that the plenum opening 220 may instead be defined by a series of aligned openings of the same size/shape, an array of openings of the same or different size/shape, etc., to best configure the downstream plenum portion 198 for substantially even air pressure out of the opening(s). For instance, the openings may be aligned and of the same width but may increase in length as they extend from the base 222 toward the second closed end 188 of the plenum body 184. In the alternative, a single opening may be defined but may increase in size (length and/or width) as it extends from the base 222 toward the second closed end 188. In such configurations, the downstream plenum portion 198 of the plenum body 184 may not need to be as tapered in shape as it extends toward the second closed end 188 to create substantially even flow of air out of the opening(s).

The gap defining the plenum opening 220 may be adjusted by a suitable nozzle assembly 232 for pressurizing the air flow through the plenum opening 220. The nozzle assembly 232 may be configured as any suitable plate, bracket, screen, or other type of configuration to help increase or otherwise adjust the pressure of the air flowing out of the plenum opening 220 and onto the return portion 136. In the depicted exemplary embodiment, first and second L-shaped brackets 238a and 238b extend along the plenum opening 220 and substantially mirror each other in their positions. In particular, the first L-shaped bracket 238a extends along the plenum opening 220 and has a first mounting portion 246a secured on the first bottom surface 234 of the downstream plenum portion 198 and partially covering the plenum opening 220. A first substantially transverse lip portion 248a extends away or downwardly from the first mounting portion 246a.

A second L-shaped bracket 238b extends along the opposite side of the plenum opening 220 and is secured to the second bottom surface 236 of the downstream plenum portion 198. The second L-shaped bracket 238b substantially mirrors the first inner L-shaped bracket 238a and has a second mounting portion 246b secured on the second bottom surface 236 of the downstream plenum portion 198 and partially covering the plenum opening 220. In that regard, the plenum opening 220 is reduced in size (i.e., covered by the first and second mounting portions 246a and 246b) to pressurize the air exiting the plenum body 184. A second substantially transverse lip portion 248b extends away from or downwardly from the second mounting portion 246b.

The first and second transverse lip portions 248a and 248b are of a suitable height (i.e., the distance they extend from the downstream plenum portion 198) and are spaced a predetermined distance from each other to cooperatively define a portion of a high-pressure nozzle assembly 232. As can be seen in FIG. 7, the first and second transverse lip portions 248a and 248b define an elongated slit or nozzle opening 258 extending along the length of the plenum opening 220 and substantially transverse to a longitudinal axis of the return portion 136 of the belt 130.

The first and second L-shaped brackets 238a and 238b may be secured to the downstream plenum portion 198 in any suitable manner, such as by passing a plurality of fasteners through openings (not labeled) in each respective part. In that regard, the fasteners may be adjustably secured within elongated openings for adjusting the gap between the first and second transverse lip portions 248a and 248b, thereby increasing or decreasing the shape and/or width of the nozzle opening 258. It should be appreciated that the nozzle opening 258 may instead be adjusted or modified in any other suitable manner, such as with optional coverings, screens, etc. Moreover, it should be appreciated that the nozzle opening 258 may instead be defined by a nozzle assembly integrated with or otherwise formed with the plenum body 184. Thus, the foregoing descriptions and illustrations provided herein should not be seen as limiting.

The transverse lip portions 248a and/or 248b may be contoured to accommodate any protruding features of the return portion 136 passing therebeneath. In this manner, the nozzle assembly 232 may be positioned as close as possible to the belt 130 for maximum drying or defrosting capabilities without interfering with the belt 130. For instance, in the depicted embodiment, the first transverse lip portion 248a may include first and second recessed end portions 250a and 250 configured to accommodate the raised edges 164 of the belt 130.

As noted above, the plenum opening 220, and therefore the nozzle opening 258, extends along substantially the entire length of the downstream plenum portion 198 and substantially transverse to a longitudinal axis of the return portion 136 of the belt 130. As can be seen in FIGS. 2 and 4, in one embodiment the downstream plenum portion 198 has a length that extends across the entire width of the return portion 136 of the conveyor 122. In this manner, highpressure air exiting the nozzle assembly 232 blows onto the entire width of the return portion 136. In that regard, the downstream plenum portion 198, and therefore the nozzle opening 258 may have a width greater than the width of the return portion 136 for increased drying efficiency.

First and second guide plates 264 and 268 may extend downwardly from the downstream plenum portion 198 at first and second ends of the nozzle opening 258, respectively, to help direct the high-pressure air toward the return portion 136. For instance, the first and second guide plates 264 and 268 may curve inwardly as they extend downwardly to direct the high-pressure air toward the raised edges 164 extending along each side margin of the open weave conveyor belt 130. Any other suitable guide plates or other structure may be used to help direct the high-pressure air toward specific portions of the return portion 136.

In operation, the high-pressure air exiting the nozzle assembly 232 may be used to blow moisture off the return portion 136 to help dry the conveyor belt 130, such as after a cleaning, rinsing, or defrost cycle. With the pressure distribution assembly 146 located between the infeed portion 134 and the return portion 136, the nozzle assembly 232 can be positioned close to the return portion 136 for maximum drying efficiency. If the nozzle assembly 232 was instead located above the infeed portion 134, as described above with reference to the prior art systems, it would need to provide sufficient clearance for the workpieces being conveyed beneath.

As noted above, the conveyor belt 130 may also be used to help defrost the conveyor belt 130. More specifically, the high-pressure air exiting the nozzle assembly 232 may be used to blow frost, ice, etc., off the return portion 136 of the conveyor belt 130. Workpieces, such as food products being frozen normally lose some moisture during processing, and some of that moisture will end up as frost or ice on the conveyor belt, which restricts air flow through the belt. The conveyor belt blower 110 may be operated while the freezer system is running (i.e., workpieces are being cooled/frozen on the conveyor 122) to help reduce the build-up of frost and ice on the belt 130, thereby increasing the capacity of the freezer and/or prolonging operation time of the freezer between defrost cycles. More specifically, because the high-pressure air is not blown onto the infeed portion 134, the conveyor belt blower 110 may be operated while the freezer system is running without disturbing or damaging the workpieces on the conveyor belt 130. Moreover, by using the cool, dry air inside the housing 126, rather than the outside warmer, moister air, no unwanted heat or moisture is added to the belt 130 during the defrosting process.

Referring to FIGS. 2, 4, and 5, as noted above, the conveyor belt blower 110 may further include a collection bin assembly 154 located below the return portion 136 that is configured to collect frost, ice, etc., blown downwardly through the open weave conveyor belt 130 during operation of the conveyor belt blower 110. The collection bin assembly 154 may include a collection bin 280 positionable beneath the plenum body 184 and having a shape and size suitable for receiving and holding a suitable amount of frost, ice, etc., blown off the return portion 136. The collection bin 280 may be secured in its position relative to the plenum body 184 through a collection bin mounting assembly 284, which may be defined by one or more brackets extending between the collection bin 280 and the plenum body 184 on the outside or lateral edges of the return portion 136.

A bottom portion of the collection bin 280 may be configured to be selectively opened either manually or automatically to empty the frost, ice, water, etc. In addition or in the alternative, a defrost assembly, such as a heating element 288 may be associated with a bottom and/or side portions of the collection bin 280 to transfer heat to the frost and ice collected, and a drain may be defined in a bottom portion of the collection bin 280 for draining the melted frost and ice. In addition or in the alternative, a frost removal device 292, such as a scraper, an auger, or the like may be associated with the collection bin 280 for pushing the frost, ice particles, etc., out of the bin 280.

The description set forth below in connection with the appended drawings, where like numerals reference like elements, is intended as a description of various embodiments of a mist management system and method and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

While illustrative embodiments have been illustrated and described, it will be appreciated that various changes can be made therein without departing from the spirit and scope of the invention.

The embodiments of the invention in which an exclusive property or privilege is claimed are defined as follows:

1. A conveyor belt blower for a conveyor belt for installation within a housing, the conveyor belt having an infeed portion and a return portion and having a length and a width, the conveyor belt blower comprising:
    a pressure distribution assembly located along the conveyor belt length between the infeed portion and the return portion, comprising:
        a plenum body having first and second ends and a bottom, the plenum body extending across at least a portion of the width of the return portion of the conveyor belt at a location within a housing; and
        a nozzle assembly extending along the bottom of the plenum body and having at least one opening extending along a length of the plenum body that is configured to direct air onto the return portion of the conveyor belt; and
    an air movement device in communication with the first end of the plenum body for flowing air into the plenum body.

2. The conveyor belt blower of claim 1, wherein the at least one opening extends across the width of the return portion of the conveyor belt.

3. The conveyor belt blower of claim 2, further comprising at least one of a first guide plate defined at a first end of the at least one opening that is configured to direct air flowing out of the at least one opening toward a first lateral edge of the return portion of the conveyor belt, and a second guide plate defined at a second end of the at least one opening that is configured to direct air flowing out of the at least one opening toward a second lateral edge of the return portion of the conveyor belt.

4. The conveyor belt blower of claim 3, wherein the conveyor belt blower is configured to blow at least one of liquid, ice, and frost off the return portion of the conveyor belt.

5. The conveyor belt blower of claim 1, further comprising a collection bin located below the pressure distribution assembly that is configured to receive at least one of frost and ice blown off the return portion of the conveyor belt.

6. The conveyor belt blower of claim 1, wherein the elongated opening of the nozzle assembly is substantially the same length as the plenum body.

7. The conveyor belt blower of claim 1, wherein the plenum body tapers in cross-sectional size as it extends from the first end to the second end.

8. The conveyor belt blower of claim 1, wherein at least one of: a cross-sectional size of the plenum body decreases as it extends from the first end to the second end; a height of the plenum body decreases as it extends from the first end to the second end; and a width of the plenum body decreases as it extends from the first end to the second end, such that substantially even air flow out of the nozzle assembly results along the length of the plenum body.

9. A conveyor belt blower for a conveyor belt having a length and a width, the conveyor belt blower comprising:
    a pressure distribution assembly located along the conveyor belt length, comprising:
        a plenum body having first and second ends, the plenum body extending across at least a portion of the width of the conveyor belt; and
        a nozzle assembly having at least one opening extending along a length of the plenum body that is configured to direct air onto the conveyor belt;
    an air movement device in communication with the first end of the plenum body for flowing air into the plenum body;

a collection bin located below the pressure distribution assembly that is configured to receive at least one of frost and ice blown off the conveyor belt; and a defrost assembly associated with the collection bin.

10. The conveyor belt blower of claim 9, wherein the defrost assembly comprises at least one of a heater and a frost removal device.

11. A processing machine, comprising:

a housing that substantially encloses a work area for processing a workpiece;

a conveyor belt having an infeed portion for moving the workpiece through the housing for processing and having a return portion having a width; and a conveyor belt blower located inside the housing, comprising:

a pressure distribution assembly located between the infeed portion and the return portion to direct the air onto the conveyor belt; and an air movement device in communication with the pressure distribution assembly for flowing air into the pressure distribution assembly, the air movement device located on a side of the conveyor belt.

12. The processing machine of claim 11, wherein the pressure distribution assembly comprises:

a plenum body having first and second ends, the plenum body extending across at least a portion of the width of the return portion of the conveyor belt; and a longitudinal nozzle assembly defining at least one opening extending along a length of the plenum body that is configured to direct air from the plenum body onto the return portion of the conveyor belt.

13. The processing machine of claim 12, wherein the air movement device is in communication with the first end of the plenum body and is configured to flow air into the plenum body.

14. The processing machine of claim 12, wherein the at least one opening extends across the width of the return portion of the conveyor belt.

15. The conveyor belt blower of claim 14, further comprising at least one of a first guide plate defined at a first end of the at least one opening that directs air flowing out of the at least one opening toward a first lateral edge of the return portion of the conveyor belt, and a second guide plate defined at a second end of the at least one opening that directs air flowing out of the at least one opening toward a second lateral edge of the return portion of the conveyor belt.

16. The processing machine of claim 11, wherein the plenum body tapers in cross-sectional size as it extends from the first end to the second end.

17. The processing machine of claim 11, wherein at least one of: a cross-sectional size of the plenum body decreases as it extends from the first end to the second end; a height of the plenum body decreases as it extends from the first end to the second end; and a width of the plenum body decreases as it extends from the first end to the second end, such that substantially even air flow out of the at least one opening results along the length of the plenum body.

18. A method of drying a conveyor belt inside a processing machine, the method comprising:

positioning a plenum body beneath an infeed portion and above a return portion of the conveyor belt at a location within the processing machine, the plenum body having a length extending between first and second ends;

flowing air into the plenum body; and directing high-pressure air out of the plenum body downwardly onto the return portion of the conveyor belt.

19. The method of claim 18, further comprising creating a substantially even pressure drop along the length of plenum body when the high-pressure air flows out of the plenum body.

20. A method of drying a conveyor belt inside a processing machine, the method comprising:

positioning a plenum body between an infeed portion and a return portion of the conveyor belt within the processing machine, the plenum body having a length extending between first and second ends;

flowing air into the plenum body;

directing high-pressure air out of the plenum body onto the return portion of the conveyor belt; and positioning the plenum body such that an elongated opening of the plenum body is substantially transverse to a longitudinal axis of the return portion and the elongated opening extends across a width of the return portion.

* * * * *